US007726625B2

(12) United States Patent
Arnold et al.

(10) Patent No.: US 7,726,625 B2
(45) Date of Patent: Jun. 1, 2010

(54) DEVICE, METHOD FOR PRODUCING THE DEVICE, CHAMBER DEVICE AND TRANSFER DEVICE

(75) Inventors: Hans-Peter Arnold, Gorheimertal (DE); Patrick Delp, Laudenbach (DE); Hellmut Freudenberg, Grossberg (DE); Achim Löll, Hesseneck (DE); Willibald Schürz, Pielenhofen (DE); Martin Simmet, Bad Abbach (DE); Günter Ziegler, Mannheim (DE); Hanspeter Zink, Regensburg (DE)

(73) Assignees: Continental Automotive GmbH, Hannover (DE); Carl Freudenberg KG, Weinheim (DE)

( * ) Notice: Subject to any disclaimer, the term of this patent is extended or adjusted under 35 U.S.C. 154(b) by 444 days.

(21) Appl. No.: 10/596,199

(22) PCT Filed: Dec. 6, 2004

(86) PCT No.: PCT/EP2004/053285

§ 371 (c)(1), (2), (4) Date: Feb. 27, 2007

(87) PCT Pub. No.: WO2005/054725

PCT Pub. Date: Jun. 16, 2005

(65) Prior Publication Data

US 2007/0241295 A1 Oct. 18, 2007

(30) Foreign Application Priority Data

Dec. 5, 2003 (DE) ................................ 103 56 848

(51) Int. Cl.
*F16K 31/12* (2006.01)

(52) U.S. Cl. ........................................ 251/57; 277/439

(58) Field of Classification Search .................. 251/57; 277/439, 634; 156/272.6, 273.3, 307.3, 307.7; 264/261, 483, 248, 249, 263, 265, 279, 347
See application file for complete search history.

(56) References Cited

U.S. PATENT DOCUMENTS 2,046,724 A * 7/1936 Buffington .................. 277/406
(Continued)

FOREIGN PATENT DOCUMENTS

CN 2305527 1/1997
(Continued)

OTHER PUBLICATIONS

International Search Report and Written Opinion for International Patent Application No. PCT/EP2004/053285 (13 pages), May 17, 2005.

(Continued)

*Primary Examiner*—John K Fristoe, Jr.
*Assistant Examiner*—Marina Tietjen
(74) *Attorney, Agent, or Firm*—King & Spalding L.L.P.

(57) ABSTRACT

A transfer device for transferring an actuator displacement, has a housing with a first recess having a first and second plunger displaceably mounted. These plungers are actively connected via at least one transfer chamber by a fluid. The active connection causes the second plunger to be displaced when the first plunger is moved and vice versa. The transfer chamber is hydraulically coupled via a sealing gap to a compensating chamber compensating the pressure differences, in a delayed manner. The transfer device also has a chamber device with a compensating chamber, a chamber housing, and a first plunger. The chamber device has a device with a first body with a recess including a second body, and with an elastomer placed in the recess between the first and second body. The elastomer has a first groove extending at least partially along the recess.

14 Claims, 3 Drawing Sheets

U.S. PATENT DOCUMENTS

| | | | | | |
|---|---|---|---|---|---|
| 3,121,569 | A * | 2/1964 | Weber et al. | 277/350 |
| 3,368,650 | A | 2/1968 | Wasdell | 188/100 |
| 3,678,809 | A | 7/1972 | Doutt | 92/86 |
| 4,396,450 | A * | 8/1983 | Blenner et al. | 156/272.6 |
| 4,693,343 | A | 9/1987 | Boyd | 188/322.17 |
| 4,813,601 | A * | 3/1989 | Schwerdt et al. | 239/91 |
| 4,858,439 | A | 8/1989 | Sawada et al. | 60/583 |
| 5,482,296 | A | 1/1996 | Peppiatt et al. | 277/24 |
| 6,273,430 | B1 | 8/2001 | Kanari et al. | 277/439 |
| 6,461,695 | B1 * | 10/2002 | Schaap | 428/34.1 |
| 6,685,105 | B1 * | 2/2004 | Ruehle et al. | 239/102.1 |
| 7,077,377 | B2 | 7/2006 | Schürz | 251/54 |
| 2003/0072510 | A1 * | 4/2003 | Zimmermann | 384/536 |

FOREIGN PATENT DOCUMENTS

| | | | |
|---|---|---|---|
| DE | 37 11 393 | A1 | 10/1987 |
| DE | 3742241 | | 12/1987 |
| DE | 40 41 677 | A1 | 6/1992 |
| DE | 4407962 | | 3/1994 |
| DE | 43 39 652 | A1 | 6/1994 |
| DE | 19942816 | | 9/1999 |
| DE | 199 50 760 | A1 | 4/2001 |
| DE | 101 62 045 | A1 | 6/2003 |
| DE | 10360450 | | 12/2003 |
| EP | 0 589 684 | A1 | 9/1993 |
| EP | 0 656 494 | A1 | 12/1993 |
| EP | 0 964 191 | A2 | 12/1999 |
| EP | 0 995 932 | A1 | 4/2000 |
| EP | 1 378 657 | A2 | 1/2004 |
| JP | 10331983 | A | 12/1998 |
| JP | 2000346012 | A | 12/2000 |

OTHER PUBLICATIONS

Japanese Office Action, Japanese application No. 2006-541955, 7 pages, Aug. 17, 2009.

* cited by examiner

DEVICE, METHOD FOR PRODUCING THE DEVICE, CHAMBER DEVICE AND TRANSFER DEVICE

CROSS-REFERENCE TO RELATED APPLICATIONS

This application is a U.S. national stage application of International Application No. PCT/EP2004/053285 filed Dec. 6, 2004, which designates the United States of America, and claims priority to German application number DE 103 56 848.4 filed Dec. 5, 2003, the contents of which are hereby incorporated by reference in their entirety.

TECHNICAL FIELD

The invention relates to a device with a first body, which has a recess, and a second body which is introduced into the recess. The invention further relates to a method for producing the device. The invention further relates to a chamber device with a chamber, which has a chamber housing which has a recess, with a plunger and with the device. The invention further relates to a transfer device, which transfers a displacement of an actuator, especially for an injection valve, with the chamber device.

BACKGROUND

A transfer device can be arranged in an injection valve of an internal combustion engine and transfers the displacement of the actuator to a needle valve. Piezoactuators, which, because of their very fast reaction to control signals are very suitable for precisely controlling the dosing of fuel and if necessary allowing several consecutive part injections during an operating cycle of a cylinder of the internal combustion engine, are used ever more frequently as actuators.

The fuel pressure in an injection valve for diesel combustion engines amounts to up to 2,000 bar. The result of this is that considerable forces have to be applied for opening or closing the injector needle. Furthermore an actuator embodied as a piezoactuator only has a far smaller lift than the lift of the injector needle required. The provision of a transfer device for transferring lift of the actuator is known, said device amplifying the lift and/or also creating a temperature-related length equalization.

A fuel injection valve is known from DE 199 50 760 which features a piezoelectric or magnetostrictive actuator. A transfer device with two lifting plungers displaceable against each other is provided between the actuator and a valve needle. The transfer device is hermetically sealed in relation to an inner valve space. The first lifting plunger is effectively connected to the actuator and has an open cylindrical shape on one side, the opening of which is arranged facing away from the actuator. The second lifting plunger is guided in the cylindrical opening. The first lifting plunger is in its turn located in a hollow cylindrical housing. A transfer chamber is embodied between an end surface of the housing and the first and the second plunger. Furthermore a tensioning spring is provided which pre-tensions the first and second plunger in opposite directions. Furthermore a compensating chamber is provided which is partly delimited by a corrugated tube and is hydraulically coupled to the transfer chamber. The compensating chamber is used to compensate for the change in volume of the transfer chamber and to supply the transfer chamber with a transfer medium at a defined pressure. This type of corrugated pipe is relatively complex and expensive however.

A transfer device for transmission of the displacement of a piezoelectric actuator of an injection valve is also known from DE 101 62 045 A1. The actuator acts on a first lifting plunger 1 which in part of its area is embodied in the form of a cylindrical pot and in the inside of which a second plunger engages which is coupled to a servo valve or an injector needle of the injection valve. The first lifting plunger is guided in a cylinder body. Likewise the second lifting plunger is guided in the cylinder body. The first and the second lifting plungers are coupled via a pressure chamber. An axial displacement of the first lifting plunger is transmitted by means of the pressure chamber into an opposite axial displacement of the second lifting plunger. Furthermore a compensating chamber is provided which compensates for the change in volume in the transfer chamber and supplies the transfer chamber with a transfer medium at a defined pressure.

SUMMARY

The object of the invention is to create a device, a method for producing the device, a chamber device and a transfer device which are simple and have a long life.

The object can be achieved by a device comprising a first body which has a recess, and a second body which is introduced into the recess, and an elastomer, which is inserted between the first and second body in the recess and thus in this area, closes and seals the space between the first and second body, wherein the elastomer comprises a first groove extending at least partly along the recess while located at a distance from the wall of the recess.

The first groove can be embodied to run all the way around within the recess. The first groove can be at a distance of 0.2 to 1.5 mm from the wall of the recess of the first body. A second groove can be embodied in the elastomer running radially inside the first groove. The second groove can be a distance of 0.2 to 1.5 mm from the position of the elastomer on the second body. The first groove can be deeper than the second groove. The second groove can be wide enough to open out into the first groove. The areas of the first and second body against which the elastomer abuts can be free of edges. The first and second body can be embodied as tubular shapes.

A chamber device may comprise a chamber comprising a chamber housing, which comprises a recess with a plunger and with such a device, wherein the chamber housing is the first body and/or the plunger the second body. The chamber housing can be connected to the first body and the plunger to the second body. The chamber housing can be welded to the first body and the plunger is welded to the second body.

A transfer device, which transfers a displacement of an actuator, may comprise a housing, comprising a first recess in which a first and a second plunger are displaceably mounted, wherein the first and the second plunger can be effectively connected via at least one transfer chamber using a fluid, the effective connection causes a displacement of the second plunger if the first plunger is moved and vice versa, and wherein the transfer chamber can be hydraulically connected via a sealing gap with a compensating chamber which provides delayed compensation for differences in pressure between the transfer chamber and the compensating chamber and with such a device, wherein the chamber can be the compensating chamber, the chamber housing can be the housing, and the plunger can be the first plunger.

The object can also be achieved by a method for producing a device with a first body which has a recess and a second body which is introduced into the recess, and an elastomer, which is inserted into the space between the first and second body in the recess and thus closes and seals in this area the space between the first and second body, with the elastomer having a first groove which extends at least partly along the recess at a distance from the wall of the recess, the method comprising the steps of:

plasma-activating the first body and the second body, providing the first body and the second body with a bonding agent in the areas in which the elastomer is to be applied, and then introducing and vulcanizing the elastomer.

As regards the device aspect, the outstanding feature of the invention is a device with a first body which has a recess, and a second body which is inserted into the recess, and an elastomer, which is introduced between the first and second body into the recess and thus in this area closes and seals the space between the first and second body, with the elastomer having a first groove extending at least partly along the recess while located at a distance from the wall of the recess. The invention thus makes use of the surprising idea that the long-term durability of the device is greatly increased by the groove, even if the elastomer is subjected to large variations in pressure, since a compression force is created by the groove, which operates from the groove through to the wall of the recess and thus the elastomer presses against the recess and thereby reinforces the sealing effect.

If the first groove is embodied as a circular groove an especially even seal along the entire recess is easily guaranteed.

It is especially advantageous if the first groove is routed at a distance of 0.2 to 1.5 mm from the wall of the recess. The sealing effect is then particularly pronounced.

In a further advantageous embodiment of the device a second groove is provided which runs radially within the first groove. The seal effect through to the second body can then also be specifically greatly improved. Advantageously the second groove is spaced at 0.2 to 1.5 mm from the position of the elastomer on the second body. This produces an especially good sealing effect between the elastomer and the second body.

In a further advantageous embodiment of the device the first groove is deeper than the second groove This enables the sealing effect to be greatly improved overall, which is based on the knowledge that sealing problems increasingly occur on the wall of the recess. It is especially advantageous in this case for the second groove to be wide enough to open out into the first groove. This has the advantage of enabling the device to be produced very simply since the tool to produce the contour of the elastomer can be removed from the mold very easily.

In a further advantageous embodiment of the device the areas of the first and second body against which the elastomer abuts are free from edges. Possible changes in cross section are rounded off. The advantage of this is that a bonding agent which is applied to the first body and the second body to ensure a good connection between the elastomer and the first or the second body can be simply applied with an even thickness to the first and second body.

Furthermore it is advantageous if the first and second body is tubular. They are then suitable for use in further bodies and can then be permanently connected to them for example by means of a welded connection. Thus the device can easily be manufactured separately and used for a chamber device for example.

As regards the chamber device aspect, the outstanding feature of the invention is a chamber device with a chamber which has a chamber housing which has a recess with a plunger and with the device, with chamber housing being the first body and/or the plunger the second body.

A further chamber device is marked by a chamber which has a chamber housing which has a recess, with a plunger and the device, with the first and second body being embodied in tubular form and the chamber housing being connected to the first body and the plunger to the second body. This connection is made especially advantageously by welding.

The invention is further marked by a transfer device which transfers the displacement of an actuator, especially for an injection valve, with a housing which features a first recess, in which a first and a second plunger are supported to allow movement, and the first and the second plunger are effectively connected via at least one transfer chamber using a fluid, with the effective connection causing a displacement of the second plunger if the first plunger is moved and vice versa, with the transfer chamber being hydraulically connected via a sealing gap to a compensating chamber, which provides delayed compensation for differences in pressure between the transfer chamber and the compensating chamber and with the chamber device, with the chamber being the compensating chamber, the chamber housing the housing, and the plunger the first plunger. This has the advantage of enabling the elastomer to be produced at low cost and thus making the compensating chamber inexpensive to manufacture overall.

The invention is further marked by a method for producing the device, in which the first body and the second body are plasma-activated, the first body and the second body are then provided with a bonding agent in the areas against which the elastomer is to abut and subsequently the elastomer is introduced and vulcanized. Through the plasma activation, which is preferably undertaken using an ionized gas, e.g. oxygen, radicals are created in the areas of the first and second body against which the elastomer is to abut which are very binding-friendly and thus lead to a very good binding of the bonding agent to the areas of the first and second body. This makes a very good connection between the first or second body and the elastomer in a very simple manner. The connection is especially good if the bonding agent is applied very evenly to the first and second body which can be simply supported by the areas of the first and second body against which the elastomer is to abut being free of edges.

BRIEF DESCRIPTION OF THE DRAWINGS

Exemplary embodiments of the invention are explained below with reference to schematic diagrams. The figures show.

Elements for which the construction and function are the same are labeled by the same reference symbols in all figures.

DETAILED DESCRIPTION

Figure 1:
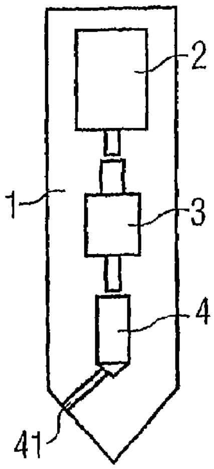
FIG. 1 an injection valve.

An injection valve 1 has an actuator 2 which is effectively connected via a transfer device 3 to a needle valve 4. The actuator 2 is preferably embodied as a piezoelectric actuator. It can however be another type of actuator which creates a lift. The transfer device 3 preferably converts the displacement of the actuator 2 in the direction of the injector needle such that a displacement of the actuator 2 in the direction of the injector needle 4 is transferred into an enlarged displacement of the needle valve 4. Furthermore it preferably also compensates for temperature-related changes in length to the actuator. Depending on its setting, the needle valve 4 closes of opens a nozzle 41 in the injection valve 1 and thereby controls the dosing of fuel.

Depending on embodiment the transfer device 3 can also transfer a displacement of the actuator 2 in the direction of the needle valve 4 in the opposite direction to the needle valve 4.

The transfer device 3 has a first plunger 6, which has an annular cylindrical shape open on one side. The annular cylindrical shape part of the first plunger 6 delimits a first transfer chamber 10, in which a second plunger 7 is guided. The first plunger 6 is inserted into a pot-shaped recess 8 of the housing 5 and is guided there. The second plunger 7 is guided in a further recess 16 of the housing 5 and extends into a recess 9 of the first plunger 6.

The second plunger 7 has a circular shoulder of which the diameter suddenly enlarges through to the area in which the first plunger 6 is guided. The shoulder forms a circular rear surface 13 of the second plunger 7. A first end face 17 of the first plunger, the rear surface 13 of the second plunger and the end surface 15 of the housing 5 delimit a second transfer chamber 11.

The second transfer chamber 11 is connected hydraulically via a first sealing gap 18, which is embodied between a side wall of the second plunger 7 and an internal wall of the first plunger 6, to the first transfer chamber 10. The first transfer chamber 10 is delimited by a second end face 19 of the first plunger 6 and an end face 20 of the second plunger 7.

The first sealing gap 18 is arranged so that it is narrow enough not to compensate for short-term pressure fluctuations between the transfer chambers 10, 11. Furthermore the second transfer chamber 11 is connected via a second sealing gap 21 which is embodied between the outer wall of the first plunger and the inner wall of the housing to a compensating chamber 22. The first transfer chamber 10 is linked hydraulically via a hole 60, which is made in the first piston 6 to the compensating chamber 22. The compensating chamber 22 is delimited by a rear surface 14 of the first plunger and by a device which is described in detail with reference to FIG. 4.

Figure 2:
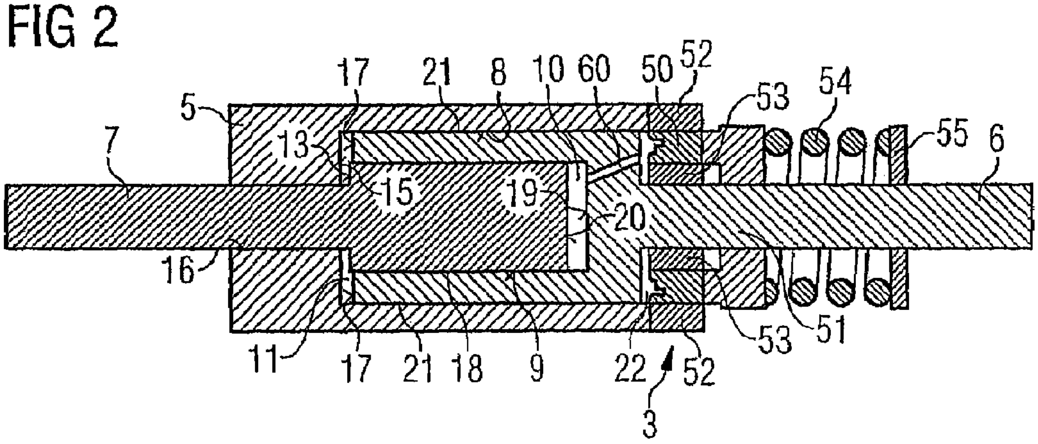
FIG. 2 a first embodiment of a transfer device.

The device comprises in the embodiment of the transfer device in accordance with FIG. 2 a first sleeve 52 and a second sleeve 53 with a smaller diameter than the first sleeve 52. An elastomer 50 is applied between the first and second sleeve 52, 53. The first sleeve 52 is permanently connected to the housing 4, preferably by means of welding. The second sleeve 53 is permanently connected to the first plunger 6 preferably also be means of welding.

Figure 3:
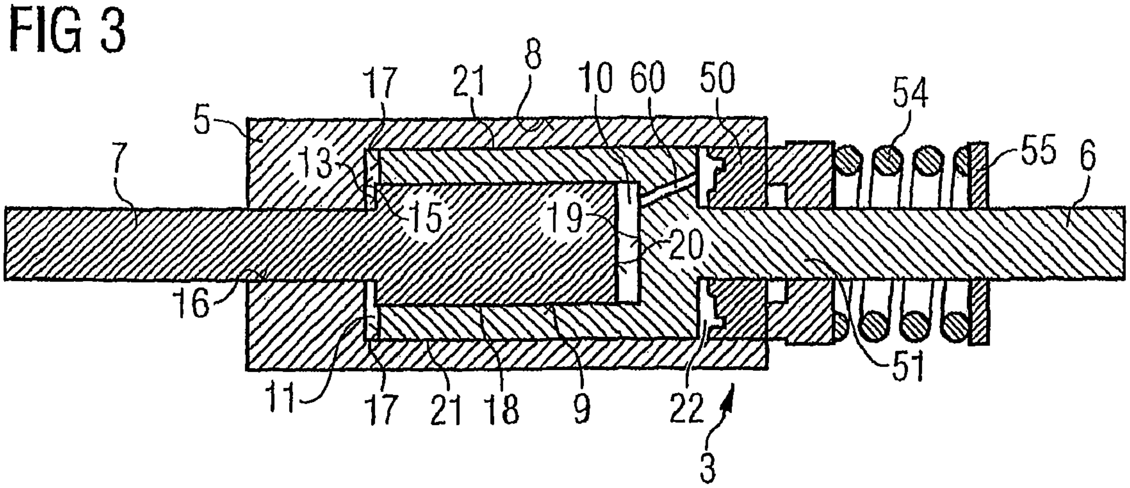
FIG. 3 a second embodiment of the transfer device.

In a second embodiment of the transfer device (FIG. 3) the elastomer 50 is introduced into the space between the first plunger 6 and the end area of the housing 5. The embodiment in accordance with FIG. 2 offers the advantage that the first and second sleeve 52, 53 and the elastomer can be produced in advance. The elastomer 50 is designed through its elastic properties to allow an increase of the volume of the compensating chamber 22 and thus avoid increases in pressure which are too great.

The first and the second transfer chamber 10, 11 and the compensating chamber 22 are filled with a fluid, preferably oil. The housing 5, the first plunger 6 and the second plunger 7 and also the first and second sleeve 52, 53 are preferably made of steel. Preferably a tensioning means 54, which is preferably embodied as a spiral spring, is provided which is supported on one side on a shoulder ring 55 and on the other side acts on the elastomer 50. The tensioning means is pre-tensioned so that the elastomer 50 is pre-tensioned in the direction of the compensating chamber 22 with a predetermined force.

Figure 4:
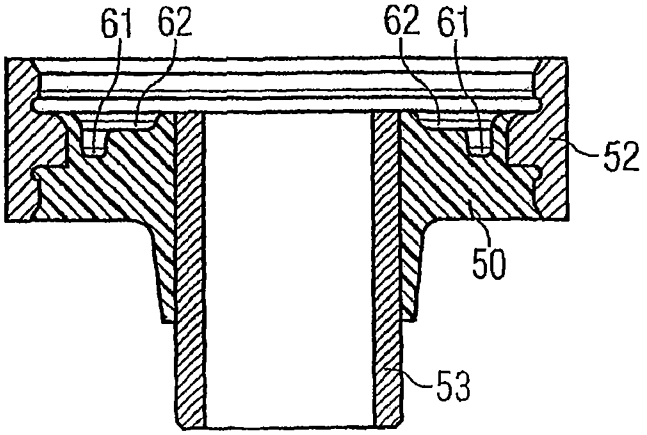
FIG. 4 a device.

In FIG. 4 the device is shown with a first body, which is embodied as a first sleeve 52, with a second body which is embodied as a second sleeve 53 and with the elastomer 50. With the embodiment of the transfer device 3 in accordance with FIG. 3, the first body is the housing 5 and the second body is the first plunger 6.

Figure 5:
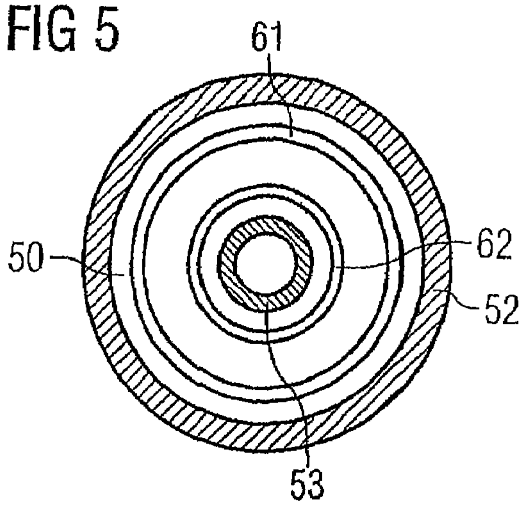
FIG. 5 a view from above of the device in accordance with FIG. 4.

The elastomer 50 is thus introduced into the area between the first sleeve 52 and the second sleeve 53 so that it closes and seals this area. A first groove 61 which extends along the recess at a distance from the wall of the recess is embodied in the elastomer 50. It is, as is shown in the view from above in FIG. 5, circular within the recess of the first sleeve 52, i.e. the area enclosed inside by the sleeve 52. It is preferably arranged at a distance from the wall of the first sleeve with a distance of 0.2 and 1.5 mm in relation to the center of the groove. The depth of the first groove is preferably selected to be between 0.2 and 1.5 mm. The effect of the groove is that pressure forces arising as a result of a relative movement of the first plunger 6 to the second plunger 7, also operate radially on the elastomer and thus press the elastomer against the wall of the first sleeve 52 and thus greatly increase its sealing effect.

Furthermore a second groove 62 is provided, the raised edge of which is preferably spaced at a distance of between 0.2 and 1.5 mm to the second sleeve 53. The second groove 62 ensures that the pressure obtaining in the compensating chamber 22 also operates radially on the second sleeve 53 and thus the elastomer 50 presses against the second sleeve 53. This means that the sealing effect is greatly improved with respect to the second sleeve 53.

Preferably the second groove 62 is embodied less deeply than the first groove 61. This is based on the knowledge that a less deep second groove is already sufficient to guarantee a sufficient density of the elastomer 50 on the second sleeve 53 as apposed to the first sleeve 52. Over and above this a minimum possible depth of the groove 61, 62 is desirable as regards a minimization of the volume of the compensating chamber 22. The fact that the second groove 62 opens out directly into the first groove 61, a simpler removal from the mold of the tool with which the elastomer in is incorporated into its form is possible, which especially as regards very small dimensions, makes the device very much simpler to manufacture.

To manufacture the device in accordance with FIG. 4, a first body embodied as a first sleeve 52 and the second body embodied as the second sleeve 53 are plasma-activated. This is preferably done by flushing with ionized gas, e.g. oxygen, where radical points are formed on the metal surfaces, which result in a very great binding-friendliness of the surface of the first and second sleeve 52, 53. Subsequently a bonding agent is applied to the first and second sleeve, preferably in the area in which the elastomer 50 is to be present. The effect of the bonding agent is better, the thinner the layer is which is provided with the bonding agent. Ideally this involves a mono molecular layer.

The rounded edges of the first and second sleeve 52, 53 guarantee that the bonding agent can easily be distributed evenly. Trials have shown that edges which are too sharp can lead to an uneven distribution of the bonding agent and thereby to local layer thickness changes, which results in the elastomer not bonding so well with the first and second sleeve 52, 53 in the thicker areas of the bonding agent and thus sealing problems being able to arise.

In a next stage of production the first and second sleeves 52, 53 are inserted into a corresponding molding tool and subsequently the elastomer mass is injected in and permanently shaped using a vulcanization process.

Figure 6:
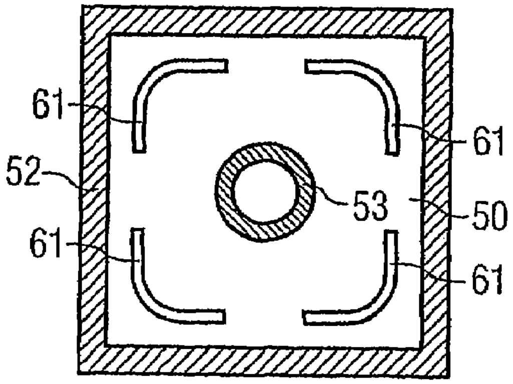
FIG. 6 a view from above of a further embodiment of the device.
Figure 7:
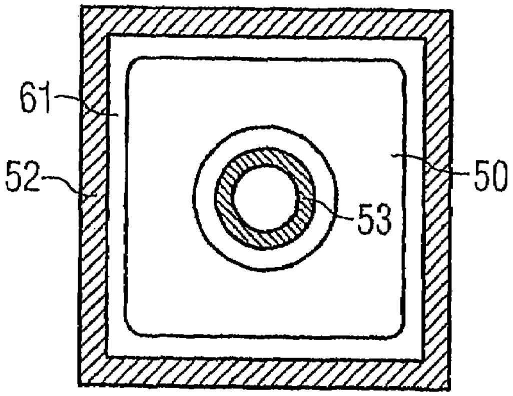
FIG. 7 a view from above of a further embodiment of the device.

A further exemplary embodiment of the device is shown with reference to FIG. 6. Instead of the annular form, the first body embodied as a tubular shape is here embodied in a basic rectangular shape. Alternatively the first and second body can however also be embodied in further tubular shapes such as an elliptical basic shape.

The first groove 61 in this embodiment is not embodied to run all the way around but only in sections, preferably in areas in which an additional radial pressure force of the elastomer 50 is necessary to guarantee the desired sealing effect and long life of the device.

In a further alternative embodiment of the device the first groove 61 is embodied in a radial direction to be wide enough for sufficient force to be exerted via it on the wall facing the first sleeve 52, in order to guarantee the seal in relation to the first sleeve 52 and simultaneously via the wall which is facing the second sleeve 53 sufficient pressing force is transmitted to guarantee a sufficient seal in relation to the second sleeve 53. The device in accordance with FIGS. 4, 5, 6 and 7 can be used for a transfer device 3 and also for any other chamber device.

LIST OF REFERENCE NUMBERS

1 injection valve
2 Actuator
3 Transfer device
4 Needle valve
5 Housing
6 First plunger
7 Second plunger
8 Recess of the housing
9 Recess in first plunger
10 First transfer chamber
11 Second transfer chamber
13 Rear surface of the second plunger
15 End surface of the housing
16 Further recess in housing
17 First end face of 1st plunger
18 First sealing gap
19 Second end face of the 1st plunger
20 End face of the 2nd plunger
21 Second sealing gap
22 Compensating chamber
23 Rear surface of the first plunger
50 Elastomer
51 Plunger rod
52 First sleeve
53 Second sleeve
54 Tensioner/tensioning spring
55 Shoulder ring
56 Transfer means
57 Protective layer
59 Stepped guide
60 Hole
61 First groove
62 Second groove

What is claimed is:

1. A device for providing a seal in an injection valve system including a housing, a first plunger, and a second plunger that translates relative to the first plunger during operation, the device comprising:

a first body which has a recess;

a second body which is introduced into the recess, wherein the second body moves relative to the first body during translation of the first plunger relative to the second plunger; and an elastomer seal, which is inserted between the first and second body in the recess and thus in this area, closes and seals the space between the first and second body, wherein the elastomer comprises:

a first side;

a second side opposite the first side;

an outer circumferential surface located generally between the first and second sides and forming a seal with the first body;

an inner circumferential surface located generally between the first and second sides and forming a seal with the second body; and a first groove formed in the first side of the elastomer seal and spaced apart from the outer circumferential surface of the elastomer seal, the first groove extending at least partly along the recess while located at a distance from the wall of the recess;

a second groove formed in the first side of the elastomer seal;

a fluid chamber defined between the first plunger and the elastomer seal, wherein the elastomer seal prevents fluid in the fluid chamber from flowing past the elastomer seal and out of the fluid chamber, wherein the first side of the elastomer seal including the first and second grooves faces into the fluid chamber such that fluid pressure in the fluid chamber acts on the grooves to increase the sealing force of the elastomer seal; and a tensioning means configured to support the elastomer seal in the space between the first and second bodies.

2. A device according to claim 1, wherein the first groove is embodied to run all the way around within the recess.

3. A device according to claim 1, wherein the first groove is at a distance of 0.2 to 1.5 mm from the wall of the recess of the first body.

4. A device according to claim 1, wherein the second groove is embodied in the elastomer seal running radially inside the first groove.

5. A device according to claim 4, wherein the second groove is a distance of 0.2 to 1.5 mm from the position of the elastomer seal on the second body.

6. A device according to claim 4, wherein the first groove is deeper than the second groove.

7. A device according to claim 6, wherein the second groove is wide enough to open out into the first groove.

8. A device according to claim 1, wherein the areas of the first and second body against which the elastomer abuts are free of ridges or shoulders.

9. A device according to claim 1, wherein the first and second body are embodied as tubular shapes.

10. A chamber device according to claim 1, wherein the housing is welded to the first body and the plunger is welded to the second body.

11. A transfer device, which transfers a displacement of an actuator, comprising:

a housing, comprising a first recess in which a first and a second plunger are displaceably mounted, wherein the first and the second plunger are effectively connected via at least one transfer chamber using a fluid, the effective connection causes a displacement of the second plunger if the first plunger is moved and vice versa, and wherein the transfer chamber is hydraulically connected via a sealing gap with a compensating chamber which provides delayed compensation for differences in pressure between the transfer chamber and the compensating chamber; and a sealing system located at a first end of the housing, the sealing system including:

a first tubular body rigidly coupled to or integral with the housing;

a second body positioned inside the first tubular body, the second body rigidly coupled to or integral with the first plunger such that the second body moves relative to the first body during displacement of the first plunger relative to the second plunger; and an elastomer seal positioned between the first tubular body and the second body, the elastomer seal including a first groove extending at least partly around the seal and located at a distance from an outer wall of the seal;

the elastomer seal closing and sealing the space between the first tubular body and the second body such that fluid in the compensating chamber is prevented from flowing past the elastomer seal;

a tensioning means configured to support the elastomer seal between the first tubular body and the second body rigidly coupled to or integral with the first plunger, the tensioning means acting on the elastomer seal but not acting on the first or second bodies.

12. A method for producing a device with a first body which has a recess and a second body which is introduced into the recess, and an elastomer, which is inserted into the space between the first and second body in the recess and thus closes and seals in this area the space between the first and second body, with the elastomer having a first groove which extends at least partly along the recess at a distance from the wall of the recess, the method comprising the steps of:

plasma-activating the first body and the second body;

providing the first body and the second body with a bonding agent in the areas in which the elastomer is to be applied; and introducing and vulcanizing the elastomer such that the elastomer is positioned in the space between the first body and the second body;

configuring a spring to act on a side of the elastomer to support the elastomer in the space between the first body and the second body, the spring acting on the elastomer seal but not acting on the first or second tubular bodies.

13. A transfer device according to claim 11, wherein the transfer device is for an injection valve.

14. A transfer device according to claim 11, wherein the elastomer comprises a first groove extending at least partly along the recess while located at a distance from the wall of the recess.

* * * * *